US010313438B1

(12) United States Patent
Bent et al.

(10) Patent No.: US 10,313,438 B1
(45) Date of Patent: Jun. 4, 2019

(54) PARTITIONED KEY-VALUE STORE WITH ONE-SIDED COMMUNICATIONS FOR SECONDARY GLOBAL KEY LOOKUP BY RANGE-KNOWLEDGEABLE CLIENTS

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US); Stephen W. Poole, Knoxville, TN (US)

(73) Assignees: EMC Corporation, Hopkinton, MA (US); Triad National Security, LLC, Los Alamos, NM (US); UT-Battelle, LLC, Oak Ridge, TN (US)

( * ) Notice: Subject to any disclaimer, the term of this patent is extended or adjusted under 35 U.S.C. 154(b) by 419 days.

(21) Appl. No.: 14/143,758

(22) Filed: Dec. 30, 2013

(51) Int. Cl.
*H04L 29/08* (2006.01)

(52) U.S. Cl.
CPC ................. *H04L 67/1097* (2013.01)

(58) Field of Classification Search
CPC ..... G06F 13/28; G06F 13/32; G06F 15/17331
See application file for complete search history.

(56) References Cited

U.S. PATENT DOCUMENTS

| 5,515,531 | A * | 5/1996 | Fujiwara | ........... G06F 17/30321 |
| 7,774,329 | B1 * | 8/2010 | Peddy | .................... G06Q 30/02 |
| | | | | 707/705 |
| 2010/0211519 | A1 * | 8/2010 | Giannetti | ............... G06Q 40/06 |
| | | | | 705/36 R |
| 2012/0109935 | A1 * | 5/2012 | Meijer | .............. G06F 17/30427 |
| | | | | 707/713 |
| 2014/0359044 | A1 * | 12/2014 | Davis | ..................... H04L 45/60 |
| | | | | 709/213 |

OTHER PUBLICATIONS

Applicant Admitted Prior Art (figures 1-4 labeled as Prior Art) submitted by the Applicant as part of the orginal disclosure as filed.*

(Continued)

*Primary Examiner* — Douglas B Blair
*Assistant Examiner* — Ishrat Rashid
(74) *Attorney, Agent, or Firm* — Ryan, Mason & Lewis, LLP

(57) ABSTRACT

Partitioned key-value stores with one-sided communications are provided for secondary global key lookup by range-knowledgeable clients. A secondary global lookups is performed in a partitioned key-value store by receiving a request from an application for a secondary global key; accessing metadata to identify a first server storing the secondary global key; instructing the identified first server to store a first value corresponding to the requested secondary global key into a memory address of the client; and returning program control to the application, wherein the first server identifies a primary key corresponding to the requested secondary global key and instructs a second server storing the corresponding primary key to store a second value corresponding to the primary key into the memory address of the client. The second server stores the second value corresponding to the primary key into the first memory address of the client.

20 Claims, 5 Drawing Sheets

(56) References Cited

OTHER PUBLICATIONS

Christopher Mitchell, Yifeng Geng, Jinyang Li—Using One-Sided RDMA Reads to Build a Fast, CPU-Efficient Key-Value Store. 2013 USENIX Annual Technical Conference (USENIX ATC '13) pp. 103-114.*

Jose et al., "Memcached Design on High Performance RDMA Capable Interconnects", International Conference on Parallel Processing, IEEE, pp. 743-752 (2011).

* cited by examiner

100

200

300

PARTITIONED KEY-VALUE STORE WITH ONE-SIDED COMMUNICATIONS FOR SECONDARY GLOBAL KEY LOOKUP BY RANGE-KNOWLEDGEABLE CLIENTS

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATIONS

The present application is related to U.S. patent application Ser. No. 14/143,749, entitled "Parallel Storage System With Burst Buffer Appliance for Storage of Partitioned Key-Value Store Across a Plurality of Storage Tiers;" and U.S. Pat. No. 9,245,048, entitled "Parallel Sort With a Ranged, Partitioned Key-Value Store in a High Performance Computing Environment," each filed contemporaneously herewith and incorporated by reference herein.

FIELD

The field relates generally to data storage, and more particularly to partitioned data stores.

BACKGROUND

Key-value stores are a powerful tool to store and retrieve large amounts of data for activities such as data analysis. One difficulty in creating these key-value stores is the need for parallelism. The large amount of data that must be stored makes a key-value store on a single node impractical for most workloads. Thus, distributed key-value stores have been proposed for storing a partitioned key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on each of the compute nodes and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range.

One challenge in a partitioned key-value store is the amount of key-value data that must be transferred, stored and processed. Thus, MDHIM employs low-latency Message Passing Interface (MPI) communications across the user-space of high performance computing (HPC) compute nodes to create a single virtual key-value store across a set of local key-value stores using ordered key-ranges.

While MDHIM has significantly improved the performance of partitioned data store in an HPC environment, a need remains for a partitioned data store that employs improved techniques for key look-ups by range-knowledgeable clients.

SUMMARY

Illustrative embodiments of the present invention provide partitioned key-value stores with one-sided communications for secondary global key lookup by range-knowledgeable clients. In one embodiment, a secondary global lookup is performed in a partitioned key-value store by receiving a request from an application for a secondary global key; accessing metadata to identify a first server storing the secondary global key; instructing the identified first server to store a first value corresponding to the requested secondary global key into a memory address of the client; and returning program control to the application, wherein the first server identifies a primary key corresponding to the requested secondary global key and instructs a second server storing the corresponding primary key to store a second value corresponding to the primary key into the memory address of the client. The second server stores the second value corresponding to the primary key into the first memory address of the client. Generally, the secondary global key has an associated value that is a primary key in a primary key-value table.

In one exemplary embodiment, the partitioned key-value store is based on a Multidimensional Data Hashing Indexing Middleware (MDHIM) framework. In addition, the partitioned key-value store optionally employs Message Passing Interface (MPI) communications. The storage into the memory address of the client optionally comprises a Remote Memory Access (RMA).

As noted above, illustrative embodiments described herein provide significant improvements relative to conventional arrangements. In some of these embodiments, use of one-sided communications for secondary global key lookup allows range-knowledgeable clients to return program control to the calling application as the secondary global key look-up continues.

DETAILED DESCRIPTION

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide partitioned key-value stores with one-sided communications for secondary global key lookup by range-knowledgeable clients. While the exemplary embodiments of the present invention employ MDHIM, other MPI-Linked partitioned data stores can be employed, as would be apparent to a person of ordinary skill in the art.

In one exemplary embodiment, range-knowledgeable clients are achieved using a "flush" command that provides range metadata information to the clients of the distributed system. In this manner, the clients can coordinate their data analysis queries in such a way that a minimum of the total data is searched for the data of interest (i.e., they only search the relevant ranges). Primary keys are the keys across which the ranges are created. Importantly, in many applications, secondary keys are likely to share a high correlation with primary keys. Thus, the same flush operation will frequently speed analysis on secondary keys as well as the primary key.

U.S. patent application Ser. No. 14/143,749, entitled "Parallel Storage System With Burst Buffer Appliance for Storage of Partitioned Key-Value Store Across a Plurality of Storage Tiers," filed contemporaneously herewith, describes a framework for a ranged distributed key-value store from multiple local key-value stores bound by an HPC interconnect such as MPI. Aspects of the present invention recognize that HPC interconnects such as MN efficiently distribute small amounts of metadata. Thus, this information can be efficiently propagated to the clients.

Figure 1:
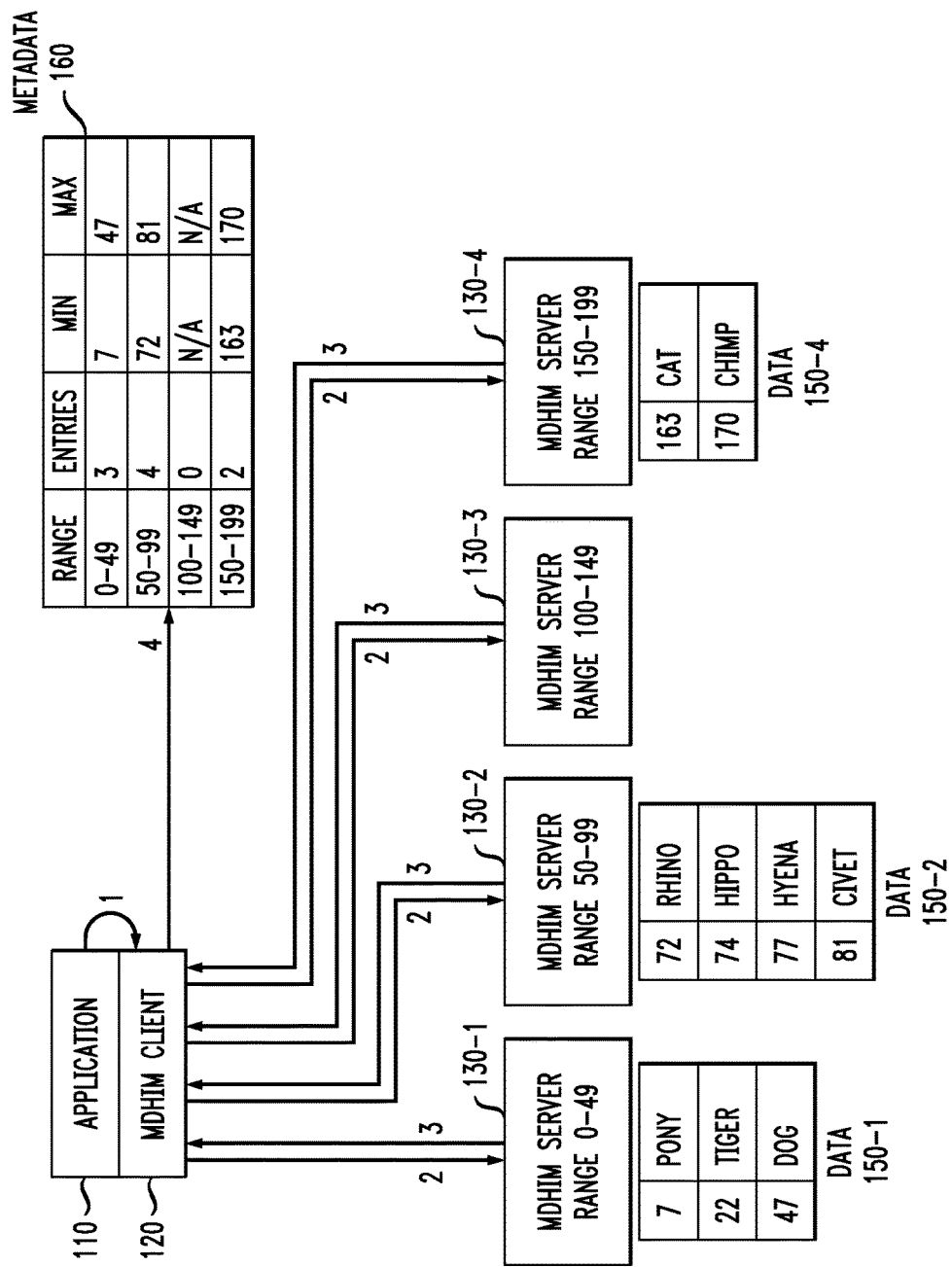
FIGS. 1-3 illustrate exemplary conventional ranged, partitioned key-value stores having range-knowledgeable clients.

FIG. 1 illustrates an exemplary conventional ranged, partitioned key-value store 100. As shown in FIG. 1, the exemplary conventional ranged, partitioned key-value store 100 comprises a plurality of MDHIM range servers 130-1 through 130-N (N equals 4 in the exemplary embodiment of FIG. 1) that each store a corresponding range of the overall key-value data 150-1 through 150-N. For example, MDHIM range server 130-1 stores key-value data 150-1 having keys in the range of 0-49 and MDHIM range server 130-2 stores key-value data 150-2 having keys in the range of 50-99. It is noted that not all MDHIM range servers 130 will have key-value data to store. For example, exemplary MDHIM range server 130-3 does not have any key-value data to store in its range of 100-149.

An exemplary application, such as application 110, can read, write and/or query key-value data to the exemplary conventional ranged, partitioned key-value store 100, using one or more MDHIM clients, such as the exemplary MDHIM client 120. Generally, the exemplary MDHIM clients 120 know the key ranges stored by each MDHIM range server 130 (e.g., which server 130 holds which key range). In addition, the exemplary MDHIM clients 120 optionally know additional statistics about the key ranges stored by each MDHIM range server 130.

As previously indicated, a flush command optionally gives the MDHIM client 120 knowledge about the statistics of the key ranges stored by each MDHIM range server 130. Following the store of keys into the exemplary conventional ranged, partitioned key-value store 100, the application 110 calls a collective mdhim_flush( ) operation during step 1 that triggers the clients 120 to send flush commands during step 2 to the range servers 130. In this manner, the MDHIM clients 120 obtain metadata about the ranges, such as the number of stored keys in each range and the minimum and maximum key in each range.

The exemplary flush( ) command use MPI global collective operations that are optimized in HPC for HPC networks. The return of the range statistics by the MDHIM range servers 130 during step 3 is also collective.

In the exemplary embodiment, each range server 130 returns statistics about its range. For example, range server 0-49 returns "I have three entries ranging from 7-47." In this example, the metadata about range server 0-49 is almost the same size as the data in that range but in typical environments, the number of keys in each range server might be tens of thousands so the metadata is a very small fraction of it.

After the flush operation, the MDHIM clients, such as MDHIM client 120, have metadata 160 comprising the obtained key statistics stored in memory about each range server 130.

With a range knowledgeable client 120, network requests are not made for the following application query to the MDHIM client 120
   get_batch(keys from 90 to 160),
since none of the MDHIM range server 130 store key-value data in this range.

For example, if an application requests the next five keys greater than key=49, the following query is possible with the range-knowledgeable clients 120:
   get_next_keys(5 keys greater than 49):
   2.1. get_next_keys(4 keys greater than 50) to MDHIM range server 130-3; and
   2.2. get_key(key=163) to MDHIM range server 130-4

For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

The keys shown in FIG. 1 are typically referred to as primary keys. In addition, many key-value stores also employ secondary keys.

Figure 2:
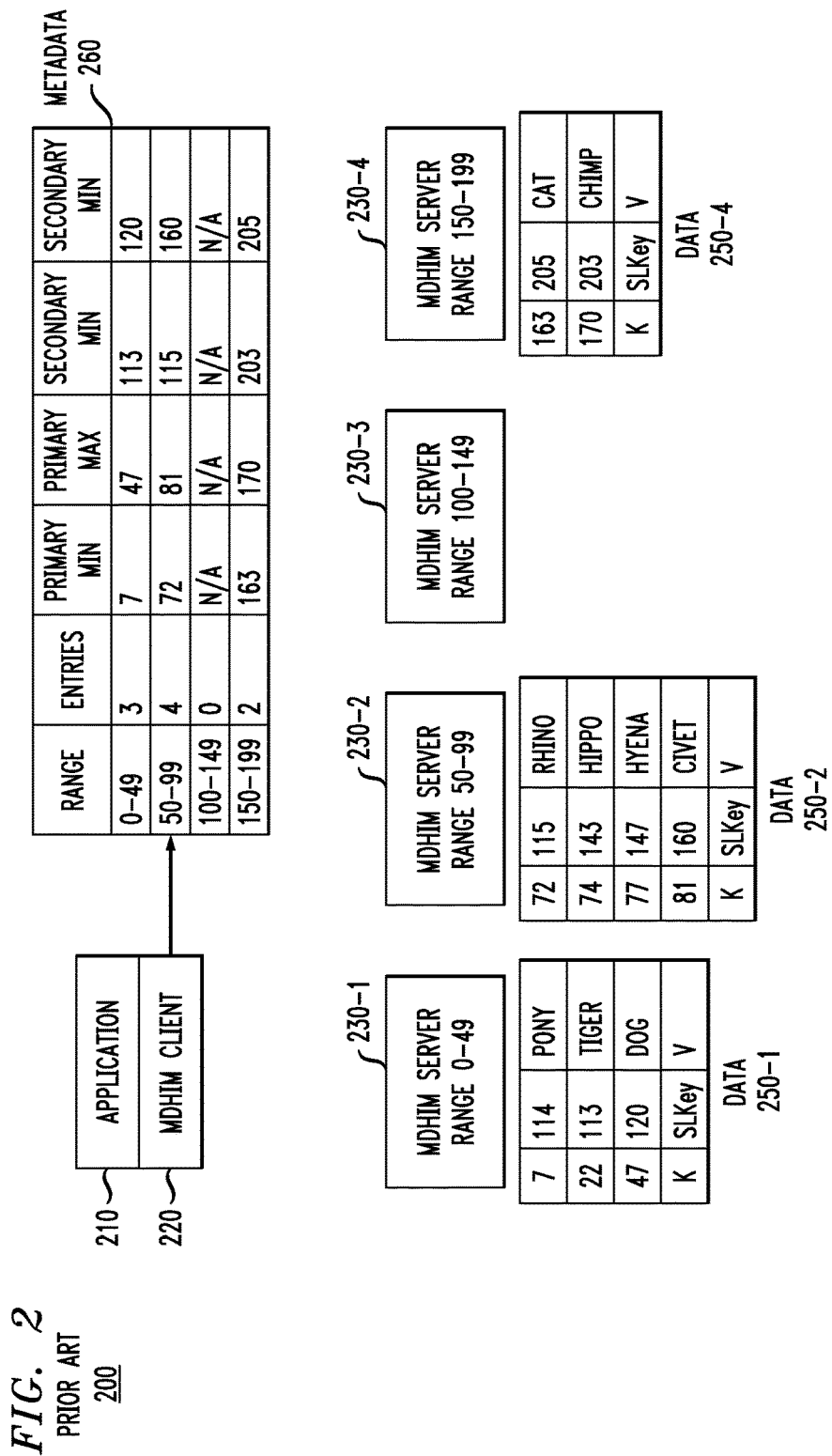

FIG. 2 illustrates an exemplary conventional ranged, partitioned key-value store 200 that supports secondary local keys. As shown in FIG. 2, the exemplary conventional ranged, partitioned key-value store 200 comprises a plurality of MDHIM range servers 230-1 through 230-N (N equals 4 in the exemplary embodiment of FIG. 2) that each store a corresponding range of the overall key-value data 250-1 through 250-N, in a similar manner to FIG. 1. An exemplary application, such as application 210, can read, write and/or query key-value data to the exemplary conventional ranged, partitioned key-value store 200, using one or more range knowledgeable MDHIM clients, such as the exemplary MDHIM client 220, in a similar manner to FIG. 1.

As shown in FIG. 2, the exemplary key-value data 250 comprises multiple keys per row in its tables, in a known manner. The first key is the primary key (K) that controls the ranges as discussed above. Unsorted secondary local keys (SLKey) can also be in the tables 250. For many applications, including scientific applications, secondary keys (SLKey) are often highly correlated with the primary keys (K) such that many of the same optimizations are possible when doing queries on secondary keys. Following the flush, the clients 220 have additional metadata 260 for the secondary keys.

After a flush operation, the MDHIM clients, such as MDHIM client 220, have metadata 260 comprising the obtained statistics stored in memory about each range server 230 for the primary and secondary local keys. In this manner, a query on a secondary key (SLKey) such as get_secondary_keys (keys between 100 and 200) can be sent only to range servers 230-1 (0-49) and 230-2 (50-99).

Figure 3:
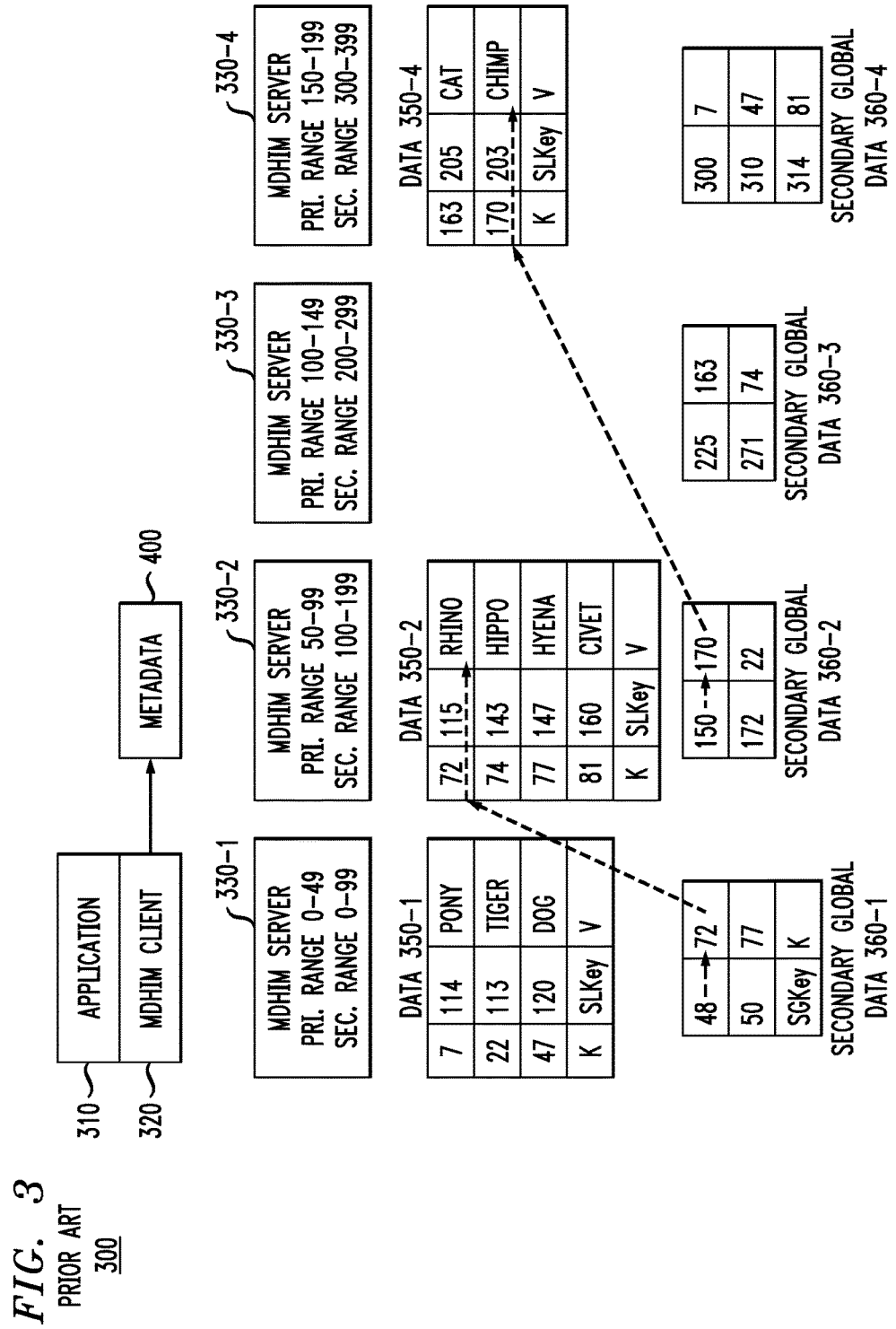

FIG. 3 illustrates an exemplary conventional ranged, partitioned key-value store 300 that supports secondary global keys. As shown in FIG. 3, the exemplary conventional ranged, partitioned key-value store 300 comprises a plurality of MDHIM range servers 330-1 through 330-N (N equals 4 in the exemplary embodiment of FIG. 3) that each store a corresponding range of the overall key-value data 350-1 through 350-N, in a similar manner to FIGS. 1 and 2.

In addition, MDHIM range servers 330-1 through 330-N each store a corresponding range of secondary global data 360-1 through 360-N. For example, MDHIM range server 330-1 stores secondary global keys in the range of 0-99 and MDHIM range server 330-2 stores secondary global keys in the range of 100-199.

An exemplary application, such as application 310, can read, write and/or query key-value data to the exemplary conventional ranged, partitioned key-value store 300, using one or more range knowledgeable MDHIM clients, such as the exemplary MDHIM client 320, in a similar manner to FIGS. 1 and 2.

As shown in FIG. 3, the exemplary key-value data 350 comprises multiple keys per row in its tables, including secondary local keys, in a similar manner to FIG. 2. In addition, the exemplary conventional ranged, partitioned key-value store 300 further comprises exemplary secondary global key data 360 comprising secondary global keys (SGKey), in a known manner. Generally, values in a secondary global table 360 are primary keys in the primary data table 350. Thus, a secondary global key (SGKey) does not point to a data record; rather a secondary global key (SGKey) points to an indicated primary global key (K) which points to a data record. For example, as shown in FIG. 3, the secondary global key (SGKey) of 48 in the secondary global data 360-1 is a pointer to primary key 72 in the primary Data 350-2, which has a corresponding value of rhino.

After a flush operation, the MDHIM clients, such as MDHIM client 320, have metadata 400, as discussed further below in conjunction with FIG. 4, comprising the obtained statistics stored in memory about each range server 330 for the primary and secondary keys.

If the application 310 requests secondary global key having a value of 150 from the range-knowledgeable MDHIM client 320, the MDHIM client 320 will go directly to MDHIM server 330-2 that stores the secondary global key=150 and posts a receive( ) to wait for the response. MDHIM server 330-2 returns that the primary key for this secondary global key is 170.

MDHIM client 320 then asks MDHIM server 330-4 for primary key=170 and posts another receive( ) to wait for the response. Finally, MDHIM server 330-4 returns the corresponding value of "chimp", whereupon the MDHIM client 320 can finally return control to the application 310.

Figure 4:
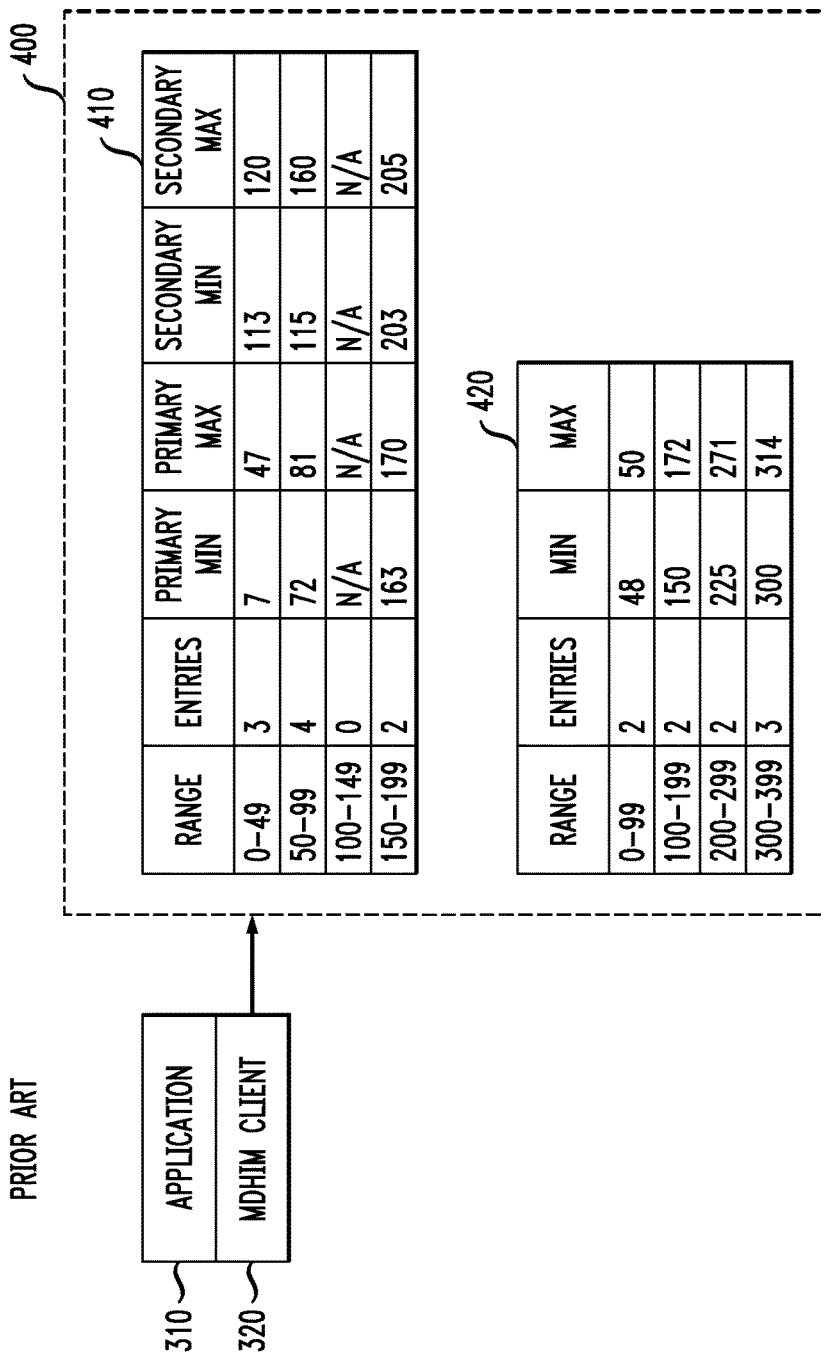
FIG. 4 illustrates exemplary metadata stored by the MDHIM clients of FIG. 3.

FIG. 4 illustrates the exemplary metadata 400 stored by the MDHIM clients 320 of FIG. 3. As shown in FIG. 4, the exemplary metadata 400 records statistics for the primary and secondary local and global keys, obtained by a flush operation. The exemplary metadata 400 comprises metadata 410 for the primary table 350 containing the sorted primary key and the unsorted secondary local keys as extracted on the flush command, in a similar manner to the metadata 260 of FIG. 2. In addition, the exemplary metadata 400 further comprises metadata 420 for sorted secondary global keys.

One Sided Communication for Secondary Global Key Look-Ups

As previously indicated, one aspect of the invention employs MPI one-sided communications for secondary global key look-ups. Generally, MPI one-sided communications provide natural access to Remote Memory Access (RMA) functionality that is provided by low-latency interconnect fabrics.

In this manner, one-sided communication functions provide an interface to Remote Memory Access communication methods that allow a single MPI process to initiate communication activity on both the sending and receiving side. Regular send/receive communications require matching MPI_Send and MPI_Recv operations to be posted by the appropriate processes, meaning that each transfer must be anticipated, and the parameters must be mutually agreed on.

For cases where the data transfer events happen irregularly but follow some general pattern, RMA may allow processes to avoid making costly barrier-type calls, or polling explicitly for updates from other processes. Compared to the usual send/receive model, this can help to reduce the synchronization overhead, i.e., the delay involved in waiting for the communicating processes to reach a state where they are ready to perform the data transfer.

RMA allows MPI implementers to take advantage of low-latency, fast communication paths that are available on some platforms where one process can directly access the memory of another process. MPI supports three exemplary RMA communication calls: MPI_Put, MPI_Get, and MPI_Accumulate. These exemplary RMA operations are non-blocking (i.e., the call initiates the transfer, but transfer may begin or continue after the call returns). A synchronization call is required to ensure that the transfer has completed. This implies that there are restrictions on how these communication calls may be overlapped, in order to guarantee correct data handling.

For an MPI_Get call (which transfers data from target memory to caller memory), the retrieved buffer should not be accessed until the transfer has completed, i.e., after a synchronization call. Likewise, for MPI_Put and MPI_Accumulate operation, the caller's communication buffer should not be updated until the transfer has completed. The rules are therefore similar to those associated with non-blocking point-to-point calls. In both situations, the programmer needs to verify when buffers can be used or modified.

Aspects of the present invention recognize that one-sided communications help with the multi-dimensional secondary global keys. One-sided communication leverages hardware assisted remote memory access (RMA) so that the receiver doesn't have to call receive( ) as the server can write the data using RMA into client memory. As indicated above, a query on a secondary global key has a fast initial lookup since it is doing a lookup on a sorted table but then it must do a second lookup in the primary table. The one-sided communications employed by the present invention allow the second lookup to be done by an MDHIM range server 330 (and not the client 320).

Figure 5:
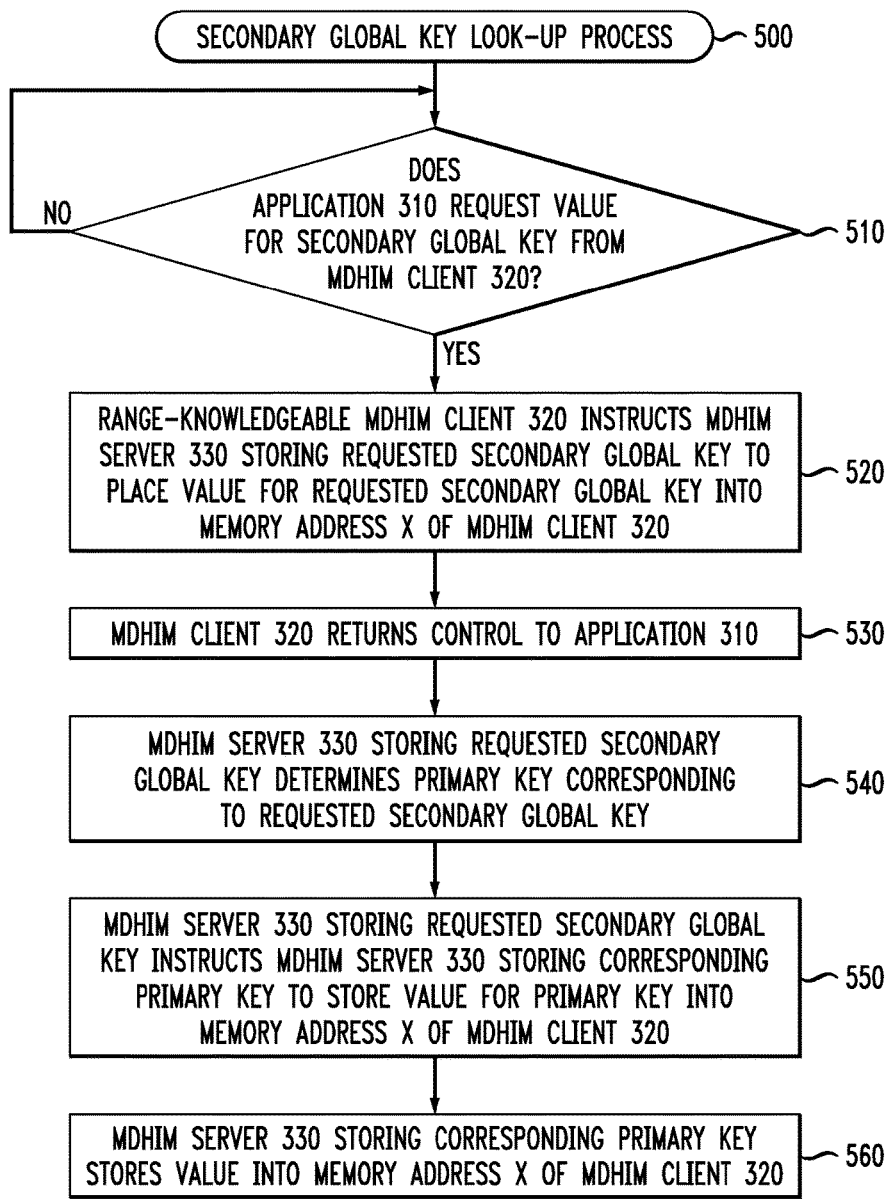
FIG. 5 is a flow chart illustrating an exemplary implementation of a secondary global look-up process that incorporates aspects of the present invention and can be used in the ranged, partitioned key-value store of FIG. 3.

FIG. 5 is a flow chart illustrating an exemplary implementation of a secondary global look-up process 500 incorporating aspects of the present invention. The secondary global look-up process 500 can be used to perform secondary global look-ups in the ranged, partitioned key-value store 300 of FIG. 3. As shown in FIG. 5, a test is initially performed during step 510 to determine if an application 310 requests a value for a secondary global key from an MDHIM client 320. If it is determined during step 510 that an application 310 does not request a value for a secondary global key from an MDHIM client 320, then program control continues to monitor until such a request is received.

If, however, it is determined during step 510 that an application 310 requests a value for a secondary global key from an MDHIM client 320, then the range-knowledgeable MDHIM client 320 instructs the MDHIM server 330 storing the requested secondary global key to place the value for the requested secondary global key into a given Memory Address (X) of the requesting MDHIM client 320, during step 520.

During step 530, the MDHIM client 320 returns control to the requesting application 310, in accordance with aspects of the present invention.

The MDHIM server 330 that stores the requested secondary global key then determines the primary key corresponding to the requested secondary global key during step 540. The MDHIM server 330 that stores the requested secondary global key then instructs the MDHIM server 330 that stores the corresponding primary key to store the value for the primary key into the given memory address (X) of the MDHIM client 320 during step 550.

Finally, during step 560, the MDHIM Server 330 that stores the corresponding primary key stores the value into the indicated memory address (X) of the MDHIM client 320.

For example, if application 310 of FIG. 3 asks the MDHIM Client 320 for a secondary global key=150, the range-knowledgeable MDHIM client 320 asks the MDHIM Server 330-2 for the secondary global key=150 and tells the MDHIM Server 330-2 to put the value into memory address X of MDHIM client 320. The MDHIM client 320 then returns program control to the application 310. The MDHIM Server 330-2 knows that the primary key for secondary global key=150 is 170 and the MDHIM Server 330-2 tells MDHIM Server 330-4 to put the value for primary key 170 into the memory address X of MDHIM client 320. Finally, the MDHIM Server 330-4 puts the value "chimp" into memory address X of MDHIM client 320.

The networks used herein may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

One or more of the devices and nodes described herein may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein may be viewed as examples of what are more generally referred to as "computer program products" storing executable computer program code.

One or more devices described herein optionally further comprise network interface circuitry. The network interface circuitry allows the corresponding device to communicate over a network with other devices. The network interface circuitry may comprise, for example, one or more conventional transceivers.

One or more devices described herein may optionally be implemented at least in part in the form of software that is stored in memory and executed by a processor.

The devices described herein comprising processor, memory and network interface components as described above is an example of what is more generally referred to herein as a "processing device." Although only a single application 110 and MDHIM client 120 are shown in the FIGS. 1-3, a given ranged, partitioned key-value store in other embodiments may comprise multiple applications and/or MDHIM clients.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the ranged, partitioned key-value stores of the present invention. Such components can communicate with other elements of the ranged, partitioned key-value store over any type of network or other communication media.

As indicated previously, components of a partitioned key-value store as disclosed herein can be implemented at least in part in the form of one or more software programs stored in memory and executed by a processor of a processing device. A memory having such program code embodied therein is an example of what is more generally referred to herein as a "computer program product."

The ranged, partitioned key-value store or portions thereof may be implemented using one or more processing platforms each comprising a plurality of processing devices. Each such processing device may comprise processor, memory and/or network interface components.

As indicated above, secondary global key look-up functionality such as that described in conjunction with FIG. 5 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the secondary global key look-up functionality as described herein. Also, the particular configurations of system and device elements shown in FIGS. 1-4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for performing a secondary global lookup in a partitioned key-value store comprising a plurality of distributed servers that each store a predefined range of primary keys and a predefined range of secondary global keys, comprising:

receiving, by a first server of said plurality of distributed servers from a client of said partitioned key-value store, an instruction to store a first value corresponding to a secondary global key, requested by an application, into a memory address of said client using a Remote Memory Access storage command, wherein said client identifies said first server storing said secondary global key using metadata indicating ranges of said secondary global keys stored by each server of said plurality of distributed servers, and wherein, following said instruction by said client to said first server, said client returns program control to said application that requested said secondary global key;

storing, by said first server, said first value corresponding to said requested secondary global key into said memory address of said client using said Remote Memory Access storage command;

identifying, by said first server, a second server of said plurality of distributed servers storing a primary key corresponding to said requested secondary global key using said predefined ranges of primary keys; and instructing, by said first server, said second server to store a second value corresponding to said corresponding primary key into a memory address of said client using a Remote Memory Access storage command by said second server.

2. The method of claim 1, further comprising the step of said second server storing said second value corresponding to said primary key into said first memory address of said client using a Remote Memory Access storage command.

3. The method of claim 1, wherein said partitioned key-value store is based on a Multidimensional Data Hashing Indexing Middleware (MDHIM) framework.

4. The method of claim 1, wherein said partitioned key-value store employs Message Passing Interface (MPI) communications.

5. The method of claim 1, wherein said client comprises a range-knowledgeable client.

6. The method of claim 5, wherein said range-knowledgeable client stores statistics regarding one or more servers storing particular ranges of said secondary global key.

7. The method of claim 1, wherein said secondary global key has an associated value that is a primary key in a primary key-value table.

8. An apparatus for performing a secondary global lookup in a partitioned key-value store comprising a plurality of distributed servers that each store a predefined range of primary keys and a predefined range of secondary global keys, the apparatus comprising:

a memory comprising one or more programs which when executed by at least one processing device implement the following steps:

receiving, by a first server of said plurality of distributed servers from a client of said partitioned key-value store, an instruction to store a first value corresponding to a secondary global key, requested by an application, into a memory address of said client using a Remote Memory Access storage command, wherein said client identifies said first server storing said secondary global key using metadata indicating ranges of said secondary global keys stored by each server of said plurality of distributed servers, and wherein, following said instruction by said client to said first server, said client returns program control to said application that requested said secondary global key;

storing, by said first server, said first value corresponding to said requested secondary global key into said memory address of said client using said Remote Memory Access storage command;

identifying, by said first server, a second server of said plurality of distributed servers storing a primary key corresponding to said requested secondary global key using said predefined ranges of primary keys; and instructing, by said first server, said second server to store a second value corresponding to said corresponding primary key into a memory address of said client using a Remote Memory Access storage command by said second server.

9. The apparatus of claim 8, wherein said second server stores said second value corresponding to said primary key into said first memory address of said client using a Remote Memory Access storage command.

10. The apparatus of claim 8, wherein said partitioned key-value store is based on a Multidimensional Data Hashing Indexing Middleware (MDHIM) framework.

11. The apparatus of claim 8, wherein said partitioned key-value store employs Message Passing Interface (MPI) communications.

12. The apparatus of claim 8, wherein said client comprises a range-knowledgeable client.

13. The apparatus of claim 12, wherein said range-knowledgeable client stores statistics regarding one or more servers storing particular ranges of said secondary global key.

14. The apparatus of claim 8, wherein said secondary global key has an associated value that is a primary key in a primary key-value table.

15. An article of manufacture for performing a secondary global lookup in a partitioned key-value store comprising a plurality of distributed servers that each store a predefined range of primary keys and a predefined range of secondary global keys, comprising a non-transitory machine readable recordable storage medium containing one or more programs which when executed implement the steps of:

receiving, by a first server of said plurality of distributed servers from a client of said partitioned key-value store, an instruction to store a first value corresponding to a secondary global key, requested by an application, into a memory address of said client using a Remote Memory Access storage command, wherein said client identifies said first server storing said secondary global key using metadata indicating ranges of said secondary global keys stored by each server of said plurality of distributed servers, and wherein, following said instruction by said client to said first server, said client returns program control to said application that requested said secondary global key;

storing, by said first server, said first value corresponding to said requested secondary global key into said memory address of said client using said Remote Memory Access storage command;

identifying, by said first server, a second server of said plurality of distributed servers storing a primary key corresponding to said requested secondary global key using said predefined ranges of primary keys; and instructing, by said first server, said second server to store a second value corresponding to said corresponding primary key into a memory address of said client using a Remote Memory Access storage command by said second server.

16. The article of manufacture of claim 15, further comprising the step of said second server storing said second value corresponding to said primary key into said first memory address of said client using a Remote Memory Access storage command.

17. The article of manufacture of claim 15, wherein said partitioned key-value store is based on a Multidimensional Data Hashing Indexing Middleware (MDHIM) framework and employs Message Passing Interface (MPI) communications.

18. The article of manufacture of claim 15, wherein said client comprises a range-knowledgeable client that stores statistics regarding one or more servers storing particular ranges of said secondary global key.

19. The article of manufacture of claim 15, wherein said secondary global key has an associated value that is a primary key in a primary key-value table.

20. The article of manufacture of claim 15, wherein said partitioned key-value store is based on a Multidimensional Data Hashing Indexing Middleware (MDHIM) framework.

* * * * *

UNITED STATES PATENT AND TRADEMARK OFFICE
CERTIFICATE OF CORRECTION

PATENT NO. : 10,313,438 B1
APPLICATION NO. : 14/143758
DATED : June 4, 2019
INVENTOR(S) : John M. Bent et al.

It is certified that error appears in the above-identified patent and that said Letters Patent is hereby corrected as shown below:

In the Specification

Column 1, Lines 8-14, replace paragraph with the following:
The United States government has rights in this invention pursuant to Contract No. DE-AC52-06NA25396 between the United States Department of Energy and Los Alamos National Security and pursuant to Contract No. DE-AC05-00OR22725 between the United States Department of Energy and UT-Battelle, LLC.

Signed and Sealed this
First Day of October, 2019

Andrei Iancu
*Director of the United States Patent and Trademark Office*